Patented Mar. 31, 1936

2,035,455

UNITED STATES PATENT OFFICE 2,035,455

METHOD OF PRODUCING DRYING OIL AND VARNISH FROM HYDROCARBON MATERIAL

August P. Bjerregaard, Okmulgee, Okla., assignor, by direct and mesne assignments, to The Gray Processes Corporation, Newark, N. J., a corporation of Delaware No Drawing. Application August 30, 1930, Serial No. 479,082

5 Claims. (Cl. 134—56)

This invention relates to a process for producing drying oil or a drying varnish from the gummy polymers removed from cracked gasoline by fuller's earth or other adsorptive materials and to the product thereof. In cracking of hydrocarbons by any of the well known cracking processes, olefins, diolefins and possibly other highly unsaturated molecules are formed. These must be removed to obtain a suitable, marketable, hydrocarbon product. A common method of eliminating these undesirable materials is by treatment with adsorptive clays under conditions which bring about conversion of the undesirable highly unsaturated molecules to higher boiling polymers. A widely used example of such a method is the well-known Gray process.

Heretofore, the polymers separated out during the treatment of cracked gasoline by adsorptive materials have been considered useless and an objectional by-product of the cracked gasoline undergoing treatment. The present invention contemplates the use of these polymers for the production of a useful oil having properties similar to those of a drying oil or drying varnish.

The polymers derived from cracked gasolines by treatment with solid adsorptive polymerizing agents vary considerably in consistency and in the yields of various grades of drying oils or drying varnishes, according to their source, that is to say, the character of the charging stock, the cracking unit, and the type of cracking operation all are variable factors which have an effect upon the polymers recovered during the purification of the gasoline. Any gummy or oily substance derived from gasoline by polymerization of unsaturated constituents thereof through the medium of the catalytic action of solid adsorptive treating agents is a suitable raw material for use in the process and is included in the term "polymer" as used herein.

The following details of the process will give a clearer understanding of the nature and scope of the invention.

The polymers used as raw material in the process are usually accompanied by small amounts of gasoline, kerosene, or other light oils not themselves suitable for conversion as drying oils or drying varnish. These lighter products are removed by distillation. The residue is heated with or without the addition of certain catalyzers and, at the same time, blowing a current of air through the hot mass. The air converts a part of the polymers into a black, brittle, glossy solid, which material forms the subject matter of my co-pending application Serial No. 479,081, filed concurrently herewith. The present invention does not deal with this black solid but with the oils recovered from the polymers and extracted from the exhaust air which carries the oil with it from the mass. The material carried over by the air which is blown through the polymer mass is purified and freed from the dark colored substances which are present in the crude polymers. When this mixture of air and polymer vapor is cooled, these air distilled polymers condense into a gummy oily liquid of progressively increasing viscosity. Steam may be used instead of air for this purifying and distillation but, in that event, the resulting distilled gummy oil is not as good as that produced by the use of air, due to the fact that it has a "bloom" or bluish color by reflected light which the air blown product does not have.

The distillation operation utilized to recover the oil from the polymers may be varied by first distilling with heat and air, keeping the temperature below the ignition temperature, then further distilling with heat and steam or other inert gas or inert vapor up to any temperature short of material decomposition of the residue. Preferably the air and steam distillates are collected separately, and the steam distillate subsequently redistilled with air, or it may be used alone or in admixture with an air distillate, without necessitating the redistilling operation.

Another variation in the operation included within the scope of this invention consists in blowing air through the hot polymers at such a temperature below the ignition temperature and for such a time as will convert the bloom producing substances into non-distillable or other non-blooming products, and then completing the distillation with heat and steam or heat and an inert gas or inert vapor up to temperatures lower than the temperatures of material decomposition.

The process may also be varied by first distilling with heat and steam or an inert gas or vapor and then redistilling the steam distillate with air. If any of the distillates suggested are not sufficiently pure, they may be advantageously redistilled with air or steam.

The temperature of the polymers while blowing with air should, for safety's sake be kept below the ignition temperature. A safe maximum temperature has been found to be 525° F., but any temperature higher than 525° F. which may be found by trial to be safe for any particular variety of polymer undergoing treatment may be used without departing from the scope of the invention.

The time required for the air distillation will vary somewhat according to the requirements. For maximum yield of drying oil, the rate of heating or distillation may be somewhat rapid or, if it is desired to hold back in the residue as much as possible of the polymers that oxidize to dark products, the rate of heating should be slower. The absolute time depends largely on the volume of the polymers undergoing treatment in this operation. The catalyzers used may be compounds of any of the metals. The metallic elements of the III, IV, V, VI, VII, and VIII groups of the periodic series of the elements are particularly useful, among which may be named cerium, cobalt, nickel, vanadium, manganese, iron and copper. Salts of the fatty acids are of particular advantage. Oleates are very useful salts for that purpose. A good product may be made without any catalyst but, in some cases, the use of a catalyst will expedite the retention in the residue of those polymer constituents which tend to darken on oxidation.

The new product will be of various degrees of consistency from an oil as mobile or fluid as linseed oil to a very viscous oil as viscous as honey, or even semi-solid. These various consistencies are obtained by collecting the distillate in fractions. The mobile oils come over first, the viscous oils last.

The new products obtained by the use of air in the distillation are free from objectionable bloom and have various shades of amber color in mass, but are all nearly colorless in thin films.

These new products will dry in thin films when exposed to air, either at ordinary temperatures or preferably at slightly elevated temperatures, first to a sticky substance and finally to a solid glossy coating which is practically unaffected by aqueous caustic alkaline solutions.

The new products are miscible in all proportions with drying linseed oil and these mixtures dry to glossy varnish coatings when exposed in thin films to the air, either at ordinary temperatures or slightly elevated temperatures. These are also miscible in all proportions with China-wood oil. A mixture of equal parts of the new product and of China-wood oil will dry to a glossy coating when exposed to the air in thin films either at ordinary temperatures or at slightly elevated temperatures. However, if the drying temperature is very low, the film will partake more of the characteristics of a dried China-wood oil film and so will not be glossy.

These new products are miscible with molten varnish makers' resins, such as rosin and others, as well as with drying oils. They are also completely soluble in all the usual thinners of the type in use with drying oils.

These new products may be used to advantage either by themselves as a transparent varnish or in mixture with other varnishes of the oil type to impart thereto properties according to the grade of the new product used. If the very thick, honey like grade is used in the mixture, it will impart body both to the liquid varnish and to the dried film. One of the useful features of this new product is the fact that the dried film is not affected by aqueous alkaline solutions such as caustic lye. It may, therefore, be used alone to advantage as a protective coating in vessels and other articles exposed to alkaline solutions.

In respect to the yields obtainable, these vary according to the type of polymer used as starting material, the conditions of distillation, the grades of distillate separately collected and other factors.

An example, in which the starting material used was heavy bodied polymers from which all the gasoline, kerosene and other thin light oils had already been removed and to which 1% cerium oleate catalyzer had been added, gave:

| | Per cent |
|---|---|
| Drying oil | 58.0 |
| Residue | 37.0 |
| Loss | 5.0 |
| | 100.0 |

Redistilled with air up to 525° F., and then further with steam up to 690° F., a sample of once distilled distillate gave:

| | Percent |
|---|---|
| Thin drying oil | 41.0 |
| Medium drying oil | 12.0 |
| Thick drying oil | 18.0 |
| Extra thick drying oil (steam) | 7.0 |
| Residue | 18.0 |
| Loss | 4.0 |
| | 100.0 |

In the specification and claims the term, "polymers", is used to include any oily or gummy substances derived from cracked gasoline by polymerization of unsaturated constituents of said gasoline through treatment with a solid adsorptive catalyst. Also the term "drying oil" is to be understood as including not only drying oil used as an admixture to varnish, but also as a material to replace a drying varnish and characterized by properties similar to those described above.

I claim as my invention:

1. A process for making oils suitable for use in varnish and the like comprising the steps of distilling from the hydrocarbon polymers recovered from treatment of cracked gasoline with solid adsorptive material, a gummy distillate, redistilling the distillate and air blowing during the distilling operation, cooling the air and vapor mixture and collecting the condensate.

2. A process for making oils suitable for use in varnish and the like from hydrocarbon polymers recovered from treatment of cracked gasoline with solid adsorptive material, said process comprising the steps of distilling said polymers with heat and simultaneously air blowing, condensing and collecting the volatile constituents evolved during the air blowing and distilling operations.

3. A process for making oils suitable for use in varnish and the like from hydrocarbon polymers recovered from treatment of cracked gasoline with solid adsorptive material, said process comprising the steps of adding a catalyzer to the polymers and subjecting them to distillation and air blowing, condensing and collecting the volatile constituents evolved from the distilling operation in the form of a distillate.

4. A process for making oils suitable for use in varnish and the like from hydrocarbon polymers recovered from treatment of cracked gasoline with solid adsorptive material, said process comprising the steps of oxidizing the heated polymers with air, subsequently distilling off the drying oils with heat and steam and condensing and collecting the distillate.

5. A process for making oils suitable for use in varnish and the like from hydrocarbon polymers recovered from treatment of cracked gasoline with solid adsorptive material, said process comprising the steps of adding a catalyzer to the polymers, then oxidizing the heated polymers with air and subsequently distilling off the drying oil with heat and steam and condensing and collecting the distillate.

AUGUST P. BJERREGAARD.